United States Patent [19]
Ezumi

[11] Patent Number: 5,870,679
[45] Date of Patent: Feb. 9, 1999

[54] METHOD FOR SWITCHING BETWEEN A SPEECH COMMUNICATION OF A PORTABLE COMMUNICATION APPARATUS AND A DATA COMMUNICATION OF A DATA TERMINAL CONNECTED THERETO

[75] Inventor: Yosuke Ezumi, Takasaki, Japan

[73] Assignee: Canon Kabushiki Kaisha, Tokyo, Japan

[21] Appl. No.: 508,252

[22] Filed: Jul. 27, 1995

[30] Foreign Application Priority Data

Aug. 3, 1994 [JP] Japan .................................. 6-182302

[51] Int. Cl.$^6$ ........................................................ H04B 1/38
[52] U.S. Cl. ........................... 755/557; 455/66; 455/575; 455/344; 455/351
[58] Field of Search ................................ 455/66, 74, 84, 455/89, 344, 347, 351, 350, 356, 357, 575; 379/58, 61, 90, 93, 94, 100; 358/434–9

[56] References Cited

U.S. PATENT DOCUMENTS

| | | | |
|---|---|---|---|
| 5,200,991 | 4/1993 | Motoyanagi | 379/61 |
| 5,237,570 | 8/1993 | Smolinske et al. | 455/84 X |
| 5,249,218 | 9/1993 | Sainton | 379/58 X |
| 5,282,238 | 1/1994 | Berland | 379/58 |
| 5,337,350 | 8/1994 | Kumahara | 379/94 X |
| 5,379,121 | 1/1995 | Yamada et al. | 358/400 |
| 5,479,485 | 12/1995 | Hayashi | 379/100 X |

FOREIGN PATENT DOCUMENTS 6-85961   3/1994   Japan .

*Primary Examiner*—Wellington Chin
*Assistant Examiner*—Philip J. Sobutka
*Attorney, Agent, or Firm*—Fitzpatrick Cella Harper & Scinto

[57] ABSTRACT

In the case where a data terminal is connected to a portable communicating apparatus and a data communication is executed, it is intended to properly switch the data communication and a speech communication in response to an incoming signal. In a handyphone, when the incoming signal is received from a wireless line, when a CNG signal or a silent state is detected by a CNG silent detection circuit, a control unit allows an activation signal generation circuit to generate an activation signal. When the activation signal is detected by an activation signal detection circuit of a facsimile terminal, the control unit outputs a first response signal to the handyphone and executes a facsimile reception. After the end of the facsimile reception, the control unit allows the handyphone to output a second response signal indicative of the end of the facsimile reception. When the second response signal is detected, the control unit of the handyphone releases the wireless line.

34 Claims, 13 Drawing Sheets

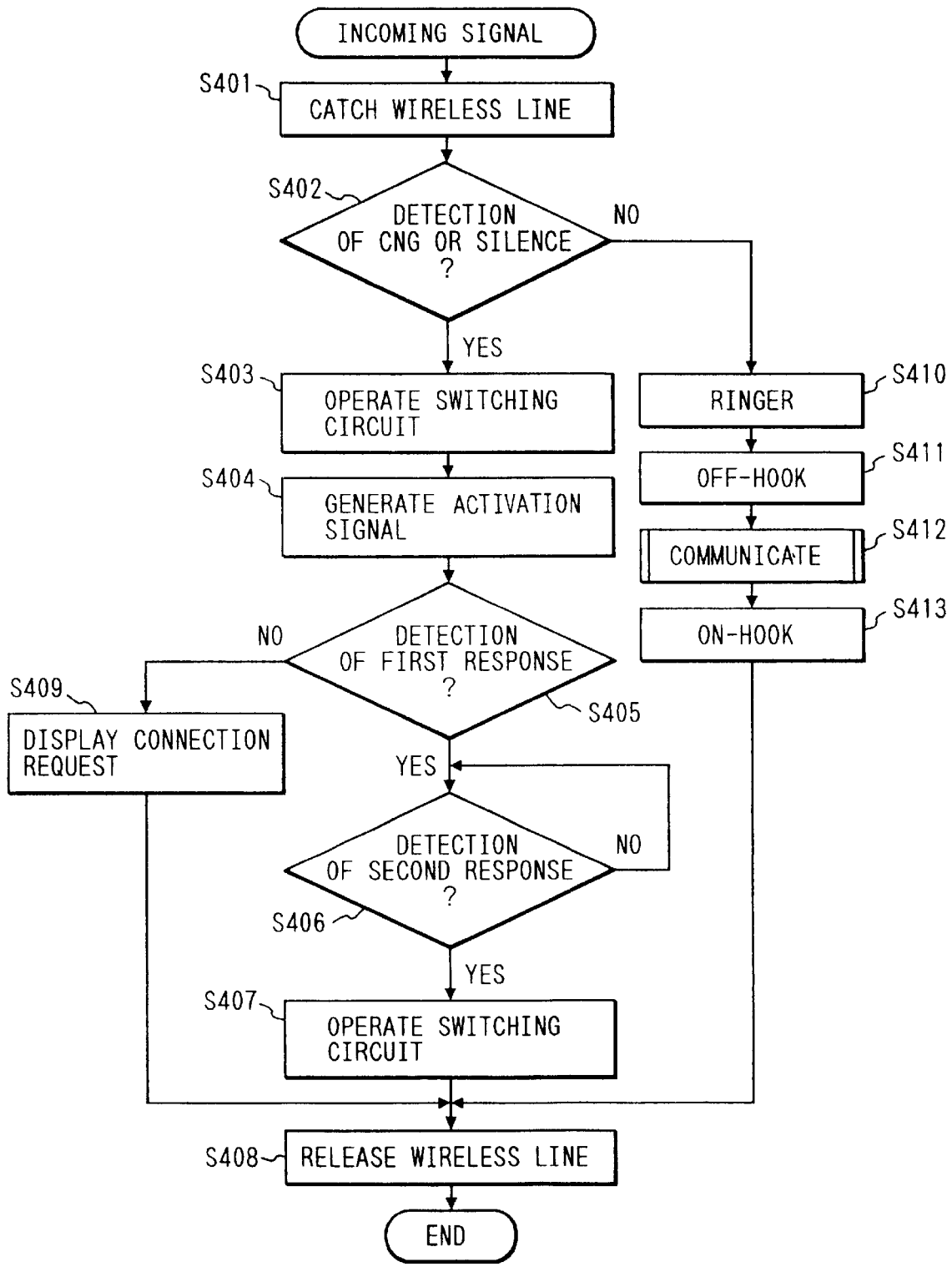

5,870,679

METHOD FOR SWITCHING BETWEEN A SPEECH COMMUNICATION OF A PORTABLE COMMUNICATION APPARATUS AND A DATA COMMUNICATION OF A DATA TERMINAL CONNECTED THERETO

BACKGROUND OF THE INVENTION

1. Field of the Invention

The invention relates to a portable communicating apparatus having a speech communicating function and to a data terminal which is connected to the portable communicating apparatus and executes a data communication through the portable communicating apparatus.

2. Related Background Art

Wireless telephone systems such as automobile telephone, portable telephone, and the like are rapidly widespread in recent years. In association with it, a facsimile communication and a communication by a personal computer are executed. The portable telephone which is used at present is equipped with an earphone microphone terminal in consideration of a case where it is impossible to cope with a use environment by ordinary speaker and microphone in dependence on the conditions such as a use condition and the like.

A data terminal is connected to the earphone microphone terminal and a data communication is executed.

FIG. 12 is a schematic diagram showing a connection construction of an earphone microphone portion of a conventional handyphone. An earphone microphone plug 50 has a terminal of three pins of a speech reception pin for an earphone 52, a speech transmission pin for a microphone 53, and a ground pin GND and is constructed so that it can be inserted to an earphone microphone terminal 51 of a handyphone 54. An earphone circuit is connected to the earphone microphone terminal 51 through an amplifier 55, a capacitor 56, and a resistor 57. A microphone circuit is connected to the earphone microphone terminal 51 through a capacitor 58, a resistor 59, and an amplifier 60.

FIG. 13 is a circuit diagram showing a construction of the conventional handyphone.

A control circuit 69 controls a demodulation circuit 67 and a modulation circuit 74 on the basis of an operation signal of a console unit 72. A radio wave received through an antenna 65 is amplified by a receiving circuit 66. After that, the amplified signal is demodulated to a voice signal by the demodulation circuit 67. The voice signal is amplified by an amplifier 68 and is generated from a speaker 62. On the other hand, the voice signal inputted to a microphone 63 is amplified by an amplifier 73 and, after that, the amplified signal is modulated by the modulation circuit 74 and is transmitted through a transmission circuit 75. When an earphone microphone plug 78 is inserted into an earphone microphone terminal 61, contacts 76 and 77 with the earphone microphone plug 78 are pushed up by a thick body of the earphone microphone plug 78, so that the input side of the speaker 62 is disconnected from the output side of the microphone 63 as shown in FIG. 14. Terminals on the microphone side and the earphone side of the earphone microphone plug 78 are connected to the amplifiers 68 and 73, so that a speech communication by the earphone and microphone can be performed.

In the above conventional apparatus, however, although a request such that a terminal apparatus such as a facsimile apparatus or the like is connected to the earphone microphone terminal and a communication is executed is increasing, since a speech communication is a main object as an application of a portable telephone, in the case where the portable telephone and the facsimile apparatus are connected by using the earphone microphone terminal of the portable telephone and such a system has an automatic receiving function, even if there is a telephone call, the system functions as a facsimile apparatus. Further, in a state in which the portable telephone and the facsimile apparatus are connected by using the earphone microphone terminal of the portable telephone, when the user wants to talk by the portable telephone, the connected cable has to be removed because of the foregoing construction.

According to Japanaese Patent Application Laid-open No. 6-85961 (published on Mar. 25, 1994), the portable telephone and the facsimile terminal are connected by using an exclusive-use inserting port to connect a facsimile terminal which the portable telephone has.

According to the apparatus as disclosed in Japanese Patent Application Laid-open No. 6-85961, although the exclusive-use inserting port for the facsimile terminal is provided, the facsimile terminal is not connected by using an earphone jack as mentioned above.

SUMMARY OF THE INVENTION

It is an object of the invention that in the case where a data terminal is connected to a portable communicating apparatus having a speech communicating function, the portable communicating apparatus can automatically and properly switch a speech communication and a data communication.

Another object of the invention is that in the case where a data terminal is connected to a portable communicating apparatus that does not have an exclusive-use connecting unit to connect the data terminal, the data terminal can judge whether a received communication signal is a speech communication or a data communication, and output a signal for switching the speech communication and the data communication to the portable communicating apparatus.

The above and other objects and features of the present invention will become apparent from the following detailed description and the appended claims with reference to the accompanying drawings.

BRIEF DESCRIPTION OF THE DRAWINGS

FIG. 4 is a flowchart showing the operation of a portable telephone of the embodiment;

DETAILED DESCRIPTION OF THE PREFERRED EMBODIMENTS

The invention will be further described hereinbelow with reference to the drawings.

Figure 1:
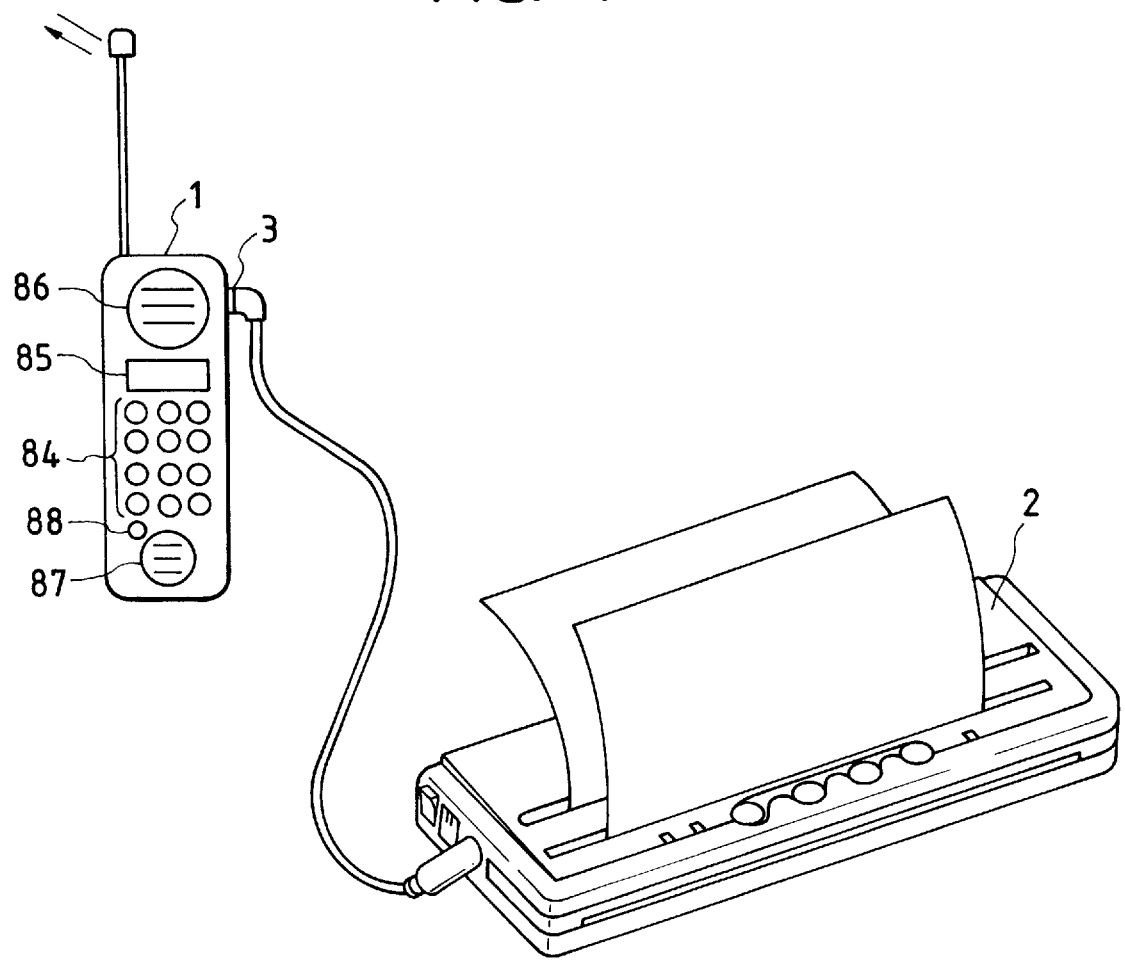
FIG. 1 is a diagram showing a system construction using an FAX/TEL switching method according to the present invention.

FIG. 1 is a diagram showing a system construction using an FAX/TEL switching method for automatically switching a facsimile communication and a communication by a portable telephone according to the invention. FIG. 1 is a diagram showing a state in which the portable telephone and a facsimile terminal are connected.

An earphone microphone plug of a facsimile terminal 2 is connected to an earphone microphone terminal 3 of a portable telephone 1. In this state, power sources of the portable telephone 1 and facsimile terminal 2 are turned on. When there is a reception call, the portable telephone 1 catches a line. Owing to the FAX/TEL switching function, the facsimile terminal is automatically set to a receivable state in case of the facsimile reception (FAX). On the other hand, in case of a telephone call (TEL), a bell (ringer unit 43) of the portable telephone 1 rings, thereby informing the operator of the telephone call.

Reference numeral 84 denotes a console unit having key switches for various operations; 85 indicates a display unit to display an operation content by the console unit 84 or the like; 86 a speaker; and 87 a microphone.

The portable telephone 1 is provided with three modes such as FAX/TEL switching mode for automatically switching a speech communication and a data communication via the facsimile apparatus in accordance with the reception call, automatic receiving mode (FAX is preferentially selected) for preferentially executing the facsimile reception, and manual receiving mode (TEL is preferentially selected) for preferentially executing the speech communication. Or, an operation key 88 by which the user can execute a switching operation by a combination of those three modes is provided for the portable telephone 1. Consequently, the user can perform the designated operation.

Upon switching of the above three modes, it is also possible to construct in a manner such that the portable telephone 1 judges whether the earphone microphone plug of the facsimile terminal 2 is connected to the earphone microphone terminal 3 or not, and when the plug is not connected to the terminal 3, the telephone cannot be set to the FAX/TEL switching mode or automatic receiving mode. Or, it is also possible to construct in a manner such that when the earphone microphone plug is not connected to the terminal 3, if the telephone is set to the FAX/TEL switching mode or automatic receiving mode, an alarm is notified to the operator by the speaker or display unit of the portable telephone 1.

Figure 2:
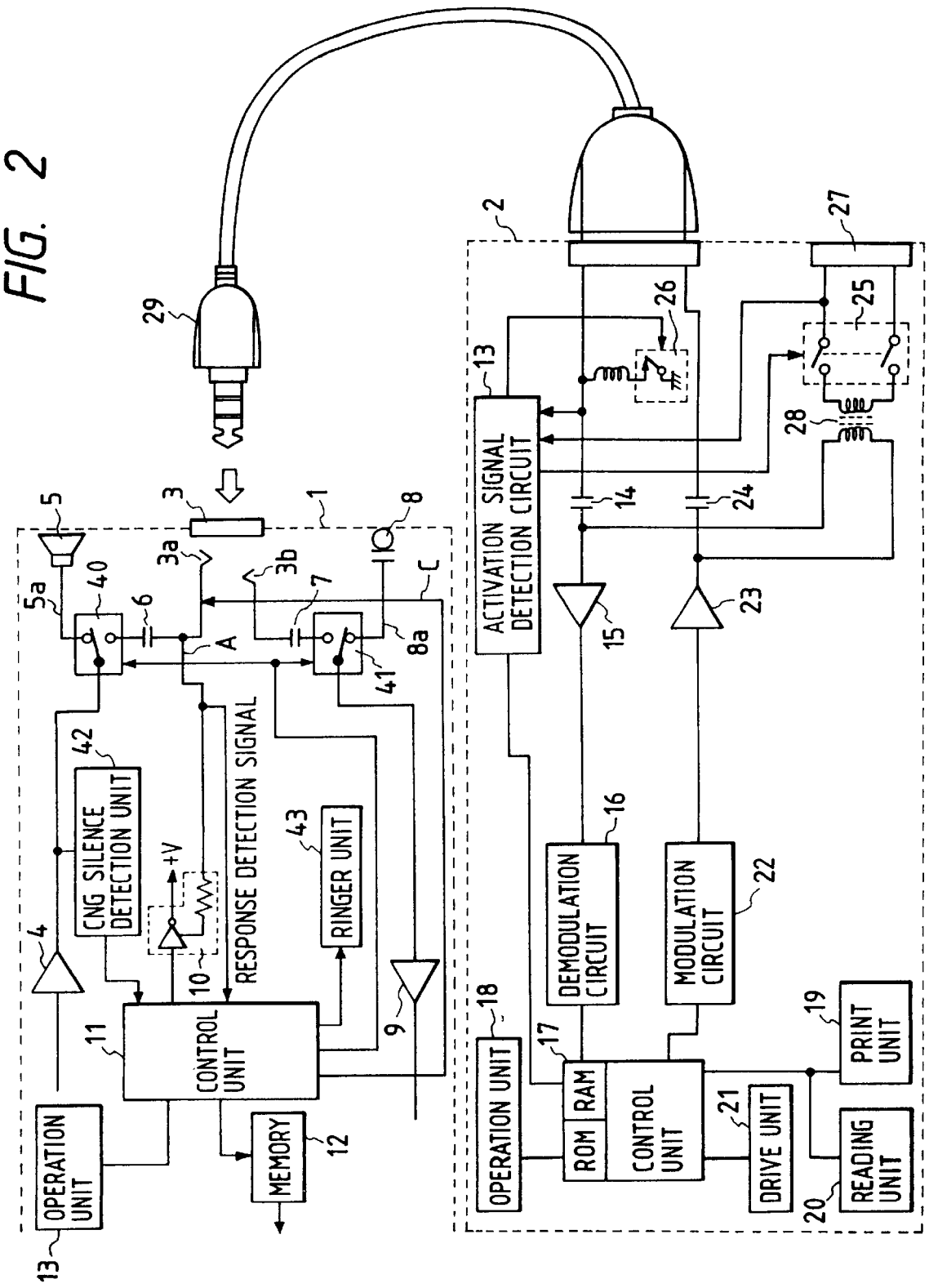
FIG. 2 is a circuit block diagram showing an embodiment of the FAX/TEL switching method of a system according to the embodiment.

FIG. 2 is a block diagram showing a construction of a system according to the embodiment. A construction of the portable telephone 1 is shown in the upper portion in FIG. 2. A construction of the facsimile terminal 2 is shown in the lower portion of FIG. 2.

A terminal 3a on the earphone side of the earphone microphone terminal 3 is connected to a speaker amplifier 4 through a capacitor 6 and a speaker/earphone switching circuit 40. A speaker 5 is connected to the speaker amplifier 4 through a signal line 5a and speaker/earphone switching circuit 40. A terminal 3b on the microphone side of the earphone microphone terminal 3 is connected to a microphone amplifier 9 through a capacitor 7 and an earphone microphone/microphone switching circuit 41. A microphone 8 is connected to the microphone amplifier 9 through a signal line 8a and the earphone microphone/microphone switching circuit 41.

Figure 3:
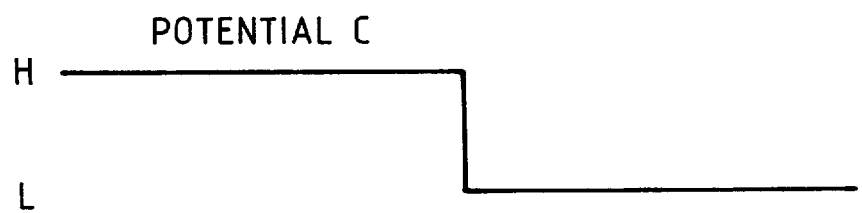
FIG. 3 is a diagram showing a change in potential of an earphone microphone terminal to judge whether or not an earphone microphone plug has been connected to an earphone microphone terminal according to the embodiment.

A control circuit 11 integratedly controls the portable telephone 1 on the basis of the contents stored in a memory 12 and executes a transmission to a line, transmission of a telephone number of the partner side, speech communication, disconnection, holding, incoming control, and FAX/TEL switching. The control circuit 11 judges whether an earphone microphone plug 29 has been connected to the earphone microphone terminal 3 or not. In such a judgment, as shown in FIG. 3, when a potential at C in FIG. 2 changes from the high level (H) to the low level (L), its change is detected and it is judged that the earphone microphone plug has been connected.

After the wireless line was caught, a CNG silence detection unit 42 detects whether the received signal is a CNG signal as a facsimile signal, silence, or a voice signal. In case of the CNG signal or silence, an operation to inform it to the control circuit 11 is executed.

An activation signal generation circuit 10 generates an activation signal under control of the control circuit 11 and its output is connected to the earphone side of the earphone microphone terminal 3. The earphone side of the earphone microphone terminal 3 is connected to the control circuit 11 to detect a response. In case of the voice signal, the ringer unit 43 is activated by the control circuit 11 and an operation to inform it to the operator is executed.

When the control circuit 11 receives an a communication signal from the wireless line, the CNG silence detection unit executes the detecting operation of the CNG signal or silence. When the CNG signal or silence is detected, it is informed to the control circuit 11. The activation signal generation circuit 10 is on-off controlled from the control circuit 11. When the earphone side of the earphone microphone terminal changes from H (high level) to L (low level), its change is detected and the reception activation is controlled.

A memory 12 is constructed by an ROM in which control contents of each control of the control circuit 11 mentioned above have been stored and an RAM serving as a work area for arithmetic operations.

An operation unit 33 has various operation keys to operate the portable telephone 1 and also has an operation key to switch the modes as mentioned above.

A construction of the facsimile terminal will now be described.

An operation unit 18 comprising an operating unit to be operated for transmission and reception is provided on a panel of the facsimile terminal 2. Depression information of each button of the operation unit 18 is inputted to a control unit 17. The control unit 17 integratedly controls the facsimile terminal 2. When the data is transmitted, a drive unit 21 is made operative and an original or the like is read by a reading unit 20. The read data is transmitted to a modulation circuit 22. Upon data reception, the received information is copied to a paper by a print unit 19. When an output of an activation signal detection circuit 13 indicates the FAX reception, a switch 26 is closed for a fixed time. In addition to a terminal 27 for a telephone line to connect to the telephone line, the facsimile terminal 2 has the earphone microphone plug 29 to connect to the portable telephone 1. The earphone side, namely, the reception side of the earphone microphone plug 29 is connected to a demodulation circuit 16 through a capacitor 14 and an amplifier 15. The reception data demodulated by the demodulation circuit 16 is inputted to the control unit 17. The activation signal detection circuit 13 is connected to the earphone side of the earphone microphone plug 29 and detects a FAX activation signal. When the FAX activation signal is detected, the receiving operation is performed and the switch is made operative, thereby informing the state of the operation, end of the operation, or the like to the portable telephone 1.

On the other hand, the data upon transmission is modulated by the modulation circuit 22 and is amplified to a proper level by an amplifier 23. A modulation signal of the amplifier 23 is outputted to the microphone side of the earphone microphone plug 29 through a capacitor 24.

The terminal 27 for telephone line is connected to the input side of the amplifier 15 and the output side of the amplifier 23 through a relay contact 25 and a transformer 28. In case of executing the ordinary facsimile communication instead of the facsimile communication by the portable telephone 1 by the facsimile terminal 2, the telephone line is connected to the terminal 27 for telephone line.

The control by the control unit 17 is executed on the basis of the contents of the ROM in the control unit 17. The processes such as an arithmetic operation and the like are executed in the RAM.

The operation in the case where there is a received communication (incoming) signal from the wireless line will now be described.

When the incoming signal is received from the wireless line, the control circuit 11 catches the wireless line. The CNG silence detection unit 42 detects whether the incoming signal indicates the CNG signal, silence, or voice signal. In case of the voice signal, the ringer unit 43 is activated by the control circuit 11 and the operator is called. When the operator off-hooks, the switching circuits 40 and 41 are switched to the speaker microphone side and a speech communication is executed. In case of the CNG signal or silence, the activation signal generation circuit 10 is activated by the control circuit 11. Further, the switching circuits 40 and 41 are switched to the earphone microphone terminal side. Subsequently, the facsimile terminal 2 is activated from the earphone microphone terminal 3. When the incoming signal is detected by the activation signal detection circuit 13, the facsimile terminal 2 executes the receiving operation and, at the same time, closes the switch 26 at fixed intervals and informs the portable telephone 1 of the reception of the signal. Thus, the potential of A changes like H—L—H, thereby informing the control circuit 11 of the start of the receiving operation by a response detection signal.

When the receiving operation is finished, the switch 26 is closed for a fixed time, thereby informing the portable telephone 1 of the end of the receiving operation. Thus, the potential at the A portion of the portable telephone 1 is changed from H to L. The control circuit 11 detects a response signal by a drop of the potential of the A portion and releases the wireless line.

FIG. 4 is a flowchart showing the operation of the portable telephone 1 upon receiving the incoming signal.

Figure 5:
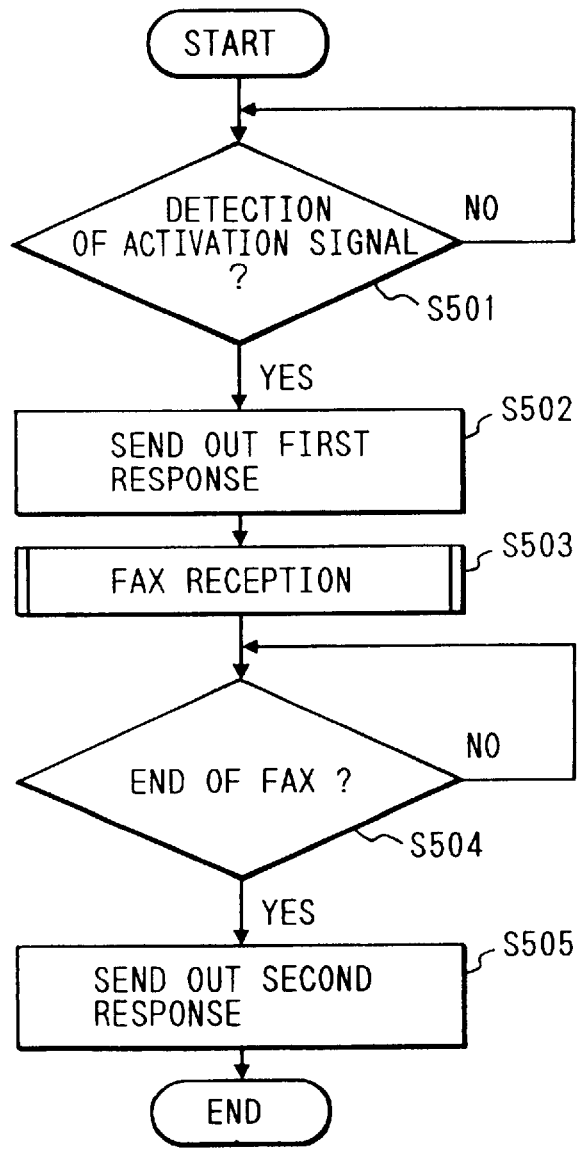
FIG. 5 is a flowchart showing the operation of a facsimile terminal of the embodiment.

FIG. 5 is a flowchart showing the operation of the facsimile terminal 2 upon receiving the incoming signal.

The operation of each unit in FIG. 2 in the case where the mode is set to the FAX/TEL switching mode will now be described with reference to the flowcharts of FIGS. 4 and 5.

First, when there is an incoming signal, the wireless line is caught in step S401 by the control circuit 11 of the portable telephone 1.

In step S402, the CNG silence detection unit 42 detects the CNG signal or silence. When the CNG or silence is detected, the switching circuits 40 and 41 are switched to the earphone microphone terminal side in step S403. In step S404, an activation signal is generated from the activation signal generation circuit 10 to the facsimile terminal 2, thereby activating the facsimile terminal 2. The activation signal is shown at 6-1 in FIG. 6. When the activation signal from the portable telephone 1 is detected by the activation signal detection circuit 13 in the facsimile terminal 2 in step S501, the control unit 17 turns on the switch 26 for the fixed time in step S502. By the turn-on of the switch 26, the potential of the A portion of the portable telephone 1 changes (a first response signal is sent from the facsimile terminal 2 to the portable telephone 1). In step S405, the first response signal is detected by the control circuit 11 due to a change in potential. Such a change in potential of the A portion at this time is shown by 6-2 in FIG. 6. When the first response signal from the facsimile terminal is detected, the control circuit 11 holds the switching circuits 40 and 41 to the earphone microphone side. In step S503, the facsimile reception is executed by the facsimile terminal 2. When the facsimile reception is finished in step S504, the control unit 17 turns on the switch 26 for the fixed time in step S505 (a second response signal is transmitted to the portable telephone 1). The second response signal is shown by 6-3 in FIG. 6. During the facsimile reception, the control circuit 11 of the portable telephone 1 monitors the potential of the A portion. When the second response signal is detected in step S406, the switching circuits 40 and 41 are switched to the speaker 5 side and microphone 8 side and the apparatus is set into a switching standby state in step S407. The wireless line is released in step S408.

When a device such as an earphone microphone or the like other than the facsimile apparatus is connected to the earphone microphone terminal 3, the detection of the first response signal is not executed in step S405. Therefore, a display to request the connection of the facsimile apparatus such as "connect facsimile" or the like is performed in step S409.

When the CNG silence detection unit 42 doesn't detect the CNG or silence in step S402, the ringer unit 43 is rung in step S410 and the apparatus waits for an off-hook. When the off-hook operation is performed by the console unit 33 in step S411, a speech communication is executed in step S412. When the communication is finished and the console unit 33 executes the on-hook operation, the wireless line is released in step S408. The processing routine is finished.

Figure 6:
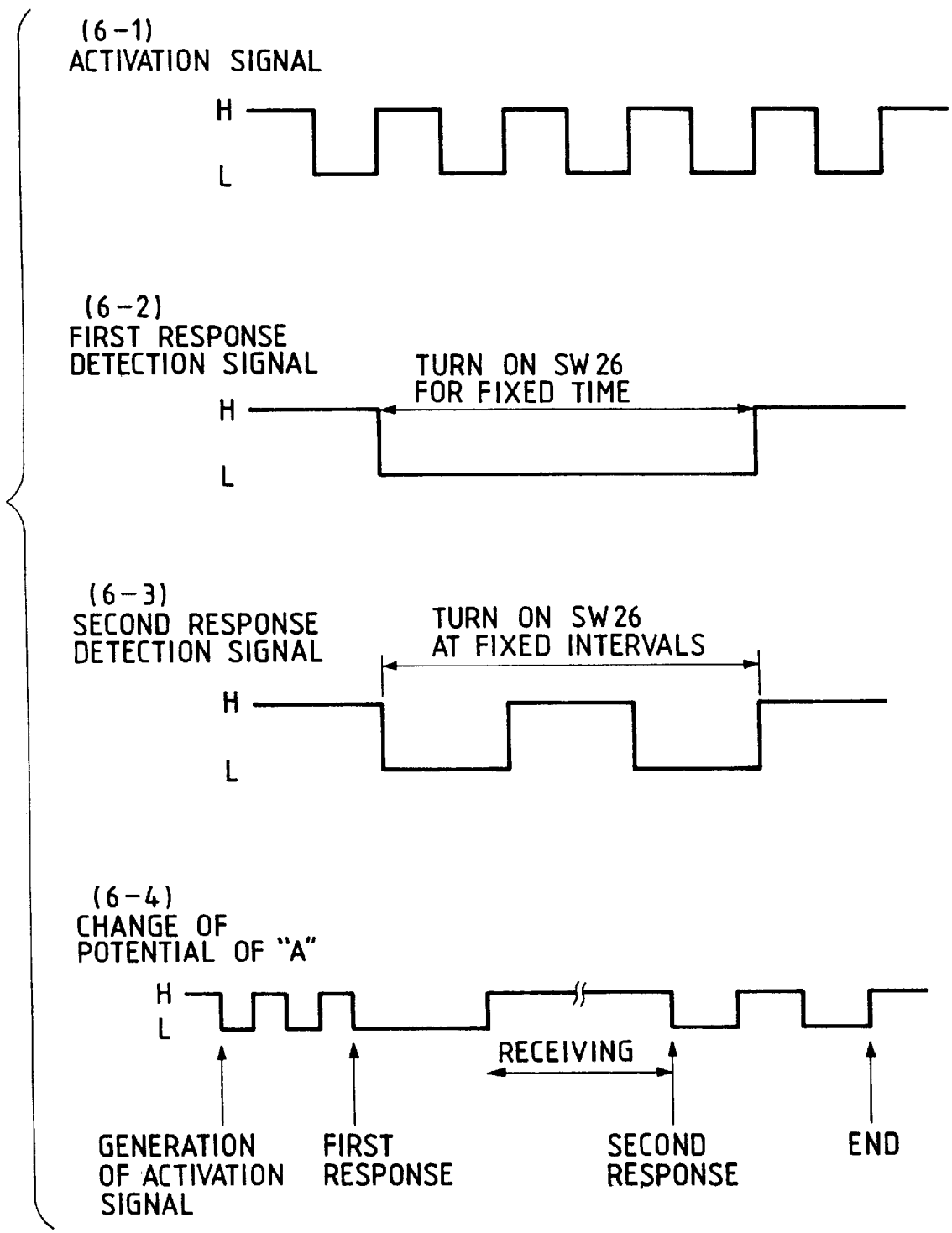
FIG. 6 is a diagram showing signals which are communicated between a portable telephone 1 and a facsimile terminal 2 in the embodiment.

A change in potential of the A portion of the portable telephone 1 in the foregoing operation is shown by 6-4 in FIG. 6. As shown in the diagram, since the transmission and reception of the activation signal, first response signal, and second response signal between the portable telephone 1 and the facsimile terminal 2 are executed by the change of the potential, an electric power is not consumed in vain. Particularly, in an apparatus which operates by a battery power like a facsimile terminal 2 that can be connected to the portable telephone 1, the activation signal, response signals, and the like can be efficiently communicated.

The above embodiment has been described with respect to the FAX/TEL switching mode. However, when the earphone microphone plug is connected in another mode, the switching circuits 40 and 41 are switched to the earphone microphone terminal 3 side and play a role similar to the conventional earphone microphone terminal.

Figure 7:
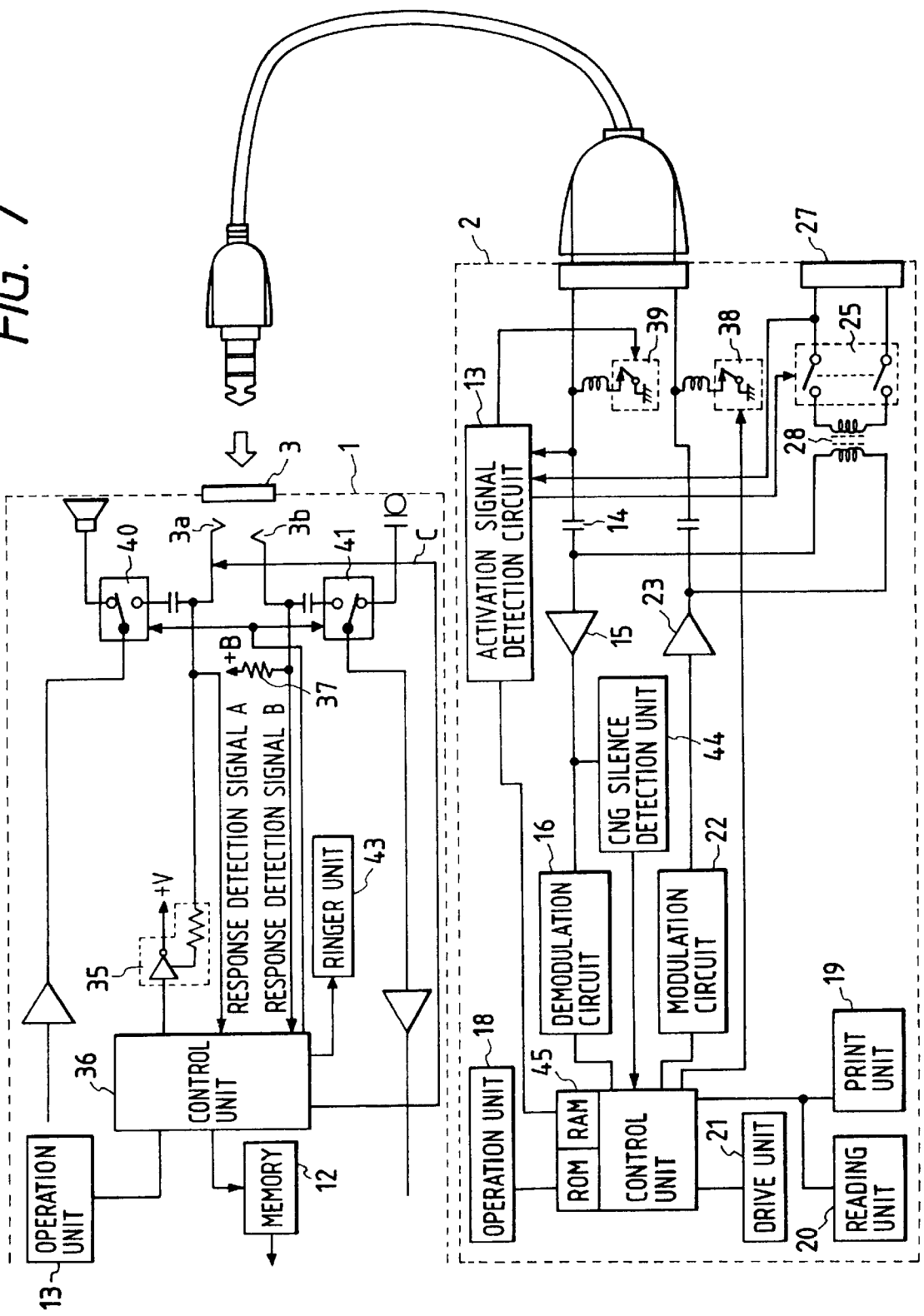
FIG. 7 is a circuit block diagram showing another embodiment of the FAX/TEL switching method of a system according to another embodiment.

FIG. 7 is a block diagram showing a construction of another embodiment.

The diagram shows an example in which the CNG silence detection unit to perform the FAX/TEL switching is provided in the facsimile main body. The construction of the portable telephone 1 is shown in the upper portion of FIG. 7. The construction of the facsimile terminal 2 is shown in the lower portion of FIG. 7. In the diagram, circuit portions similar to those shown in FIG. 2 are designated by the same reference numerals.

In the embodiment as well, since three modes can be selected and a mode setting method is also executed in a manner similar to the foregoing embodiment, their descriptions are omitted here.

A control circuit 36 integratedly controls the portable telephone 1 and executes a transmission for the line, transmission of a telephone number of the partner, catching of a line, speech communication, disconnection, holding, and incoming signal control.

When the connecting state of the earphone microphone plug is detected by a change in potential of C and the mode is set to the FAX/TEL switching mode or automatic receiving mode, the control circuit 36 switches the switching circuits 40 and 41 to the earphone microphone terminal 3 side.

An incoming signal generation circuit 35 generates an activation signal under control of the control circuit 36 and its output is connected to the earphone side of the earphone microphone terminal 3. The earphone side of the earphone microphone terminal 3 is connected to the control circuit 36 in order to detect a response. When there is an incoming signal from the wireless line, the control circuit 36 controls the activation signal generation circuit 35, thereby generating the activation signal. The microphone side of the earphone microphone terminal is connected to a power source +B through a resistor 37 and is, further, connected to the control circuit 36 in order to detect a response detection signal B. When the response detection signal B changes from H to L, the control circuit 36 detects its level change and executes a control of the switching circuits 40 and 41 and an activation control of the ringer unit 43.

The memory 12 is constructed by an ROM in which control contents to execute each control of the control circuit 36 mentioned above have been stored and an RAM serving as a work area for arithmetic operations.

The operation unit 33 has various operation keys to operate the portable telephone 1 and also has an operation key for a mode switching or the like.

The construction of the facsimile terminal will now be described.

A construction of the operation unit 18, a control unit 45, drive unit 21, reading unit 20, print unit 19, demodulation circuit 16, amplifiers 15 and 23, capacitors 14 and 24, terminal 27 for telephone line, relay contact 25, and transformer 28 of the facsimile terminal 2 is similar to that shown and described in FIG. 2. A switch 39 to indicate a response to the incoming is connected to the earphone side of the earphone microphone terminal. Further, the CNG silence detection unit is provided after the capacitor 14 and amplifier 15. A switch 38 which is made operative by the activation of the control unit 45 when the CNG or silence is detected by the CNG silence detection unit is connected to the microphone side. The control of the control unit 45 is executed on the basis of the contents of the ROM in the control unit. The processes such as an arithmetic operation and the like are executed in the RAM.

The operation when there is an incoming signal from the wireless line in the case where the mode is set to the FAX/TEL switching mode is detected by a method whereby the wireless line is caught by the control unit 36 and the activation signal is generated from the activation signal generation circuit 35 and is detected by the activation signal detection circuit 13 through the earphone microphone terminal 3. In this instance, the switching circuits 40 and 41 are switched to the earphone microphone terminal 3. Subsequently, the CNG silence detection unit detects whether the incoming signal indicates the CNG, silence, or voice. When it is the voice signal, the control unit 45 closes the switch 38 at fixed intervals, so that the response detection signal B of the portable telephone 1 changes from H to L to H, thereby responding to the control unit 36. Thus, the control unit 36 activates the ringer unit 43 and calls the operator. When the operator off-hooks, the switching circuits 40 and 41 are switched to the speaker microphone side, thereby performing a speech communication. In case of the CNG or silence, the control unit 45 closes the switch 38 for a fixed time, so that the response detection signal B of the portable telephone 1 changes from H to L, thereby responding to the control unit 36. Thus, a signal to start the receiving operation is generated from the activation signal generation circuit 35 and the switching circuits 40 and 41 are held on the earphone microphone terminal side. When the activation signal detection circuit 13 detects the signal, the receiving operation is started. After completion of the receiving operation, by again supplying the signal from the switch 39 to the portable telephone 1, the response detection signal A is sent to the control unit 36, thereby finishing the operation.

Figure 8:
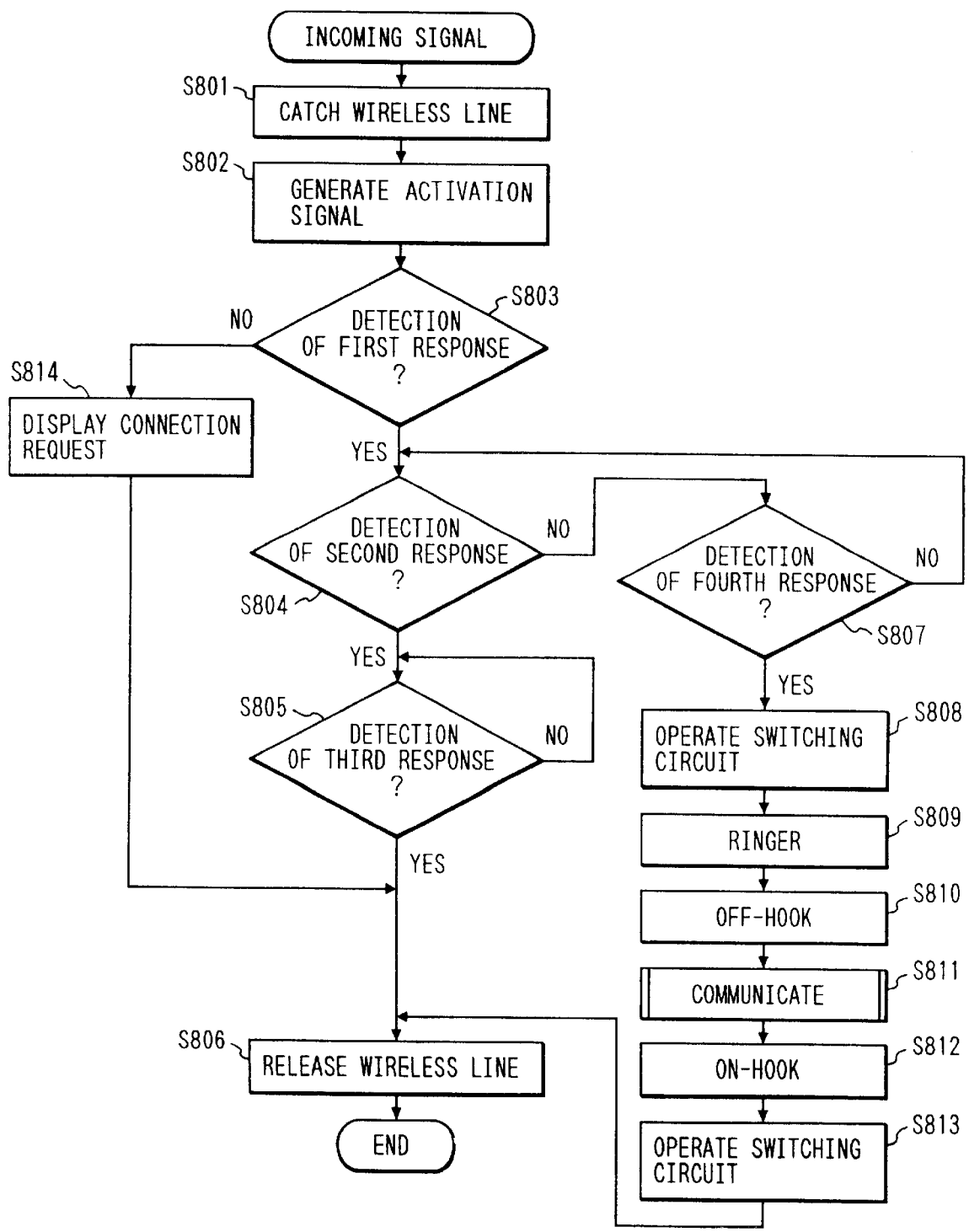
FIG. 8 is a flowchart showing the operation of a portable telephone of another embodiment.

FIG. 8 is a flowchart showing the operation of the portable telephone 1 upon receiving an incoming signal.

Figure 9:
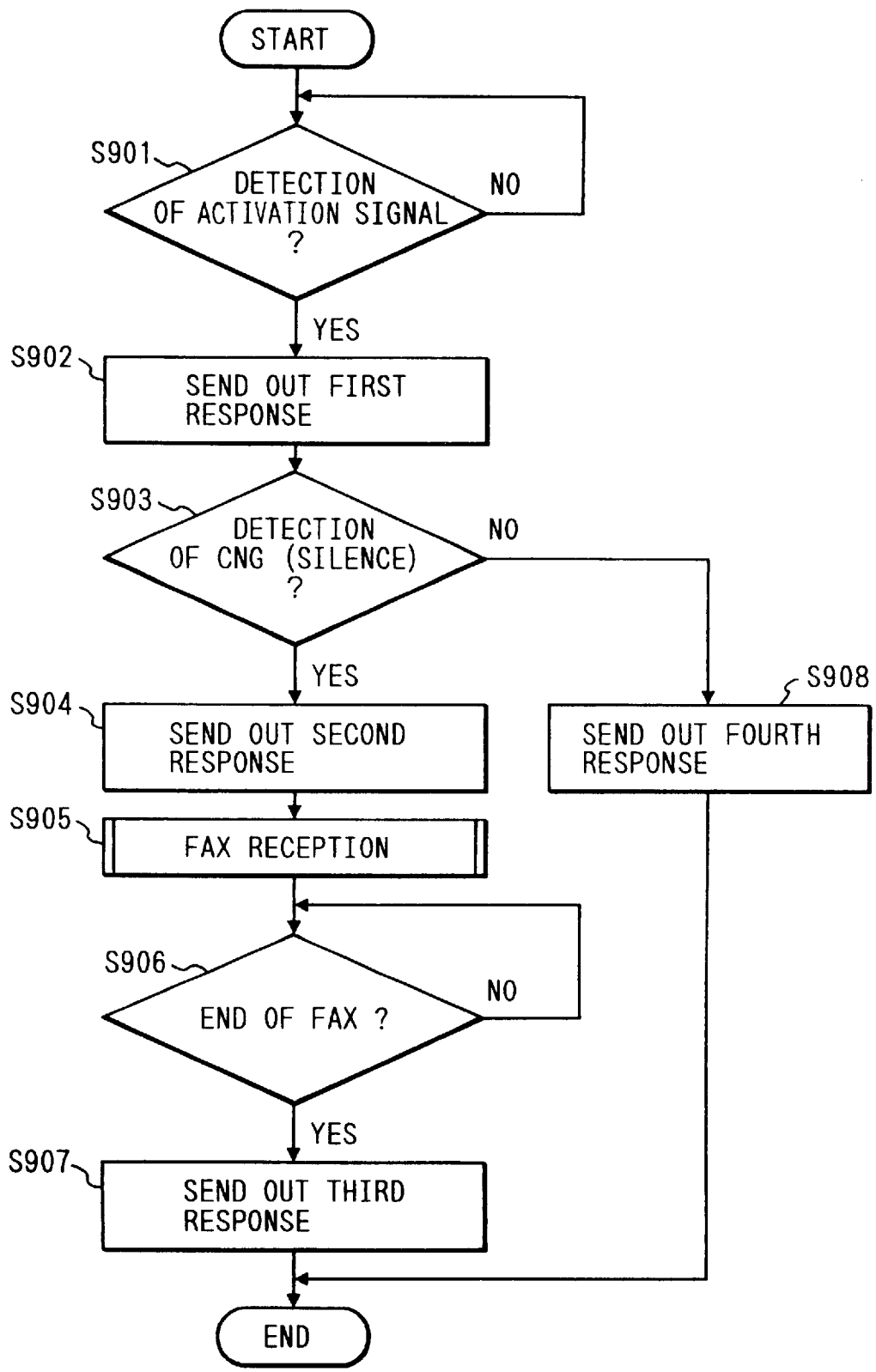
FIG. 9 is a flowchart showing the operation of a facsimile terminal of another embodiment.

FIG. 9 is a flowchart showing the operation of the facsimile terminal 2 upon receiving an incoming signal.

The operation of FIG. 7 will now be described hereinbelow with reference to FIGS. 8 and 9.

First, when there is an incoming signal from the wireless line, the control unit 36 of the portable telephone 1 catches the wireless line in step S801. In step S802, the control unit 36 changes the potential of the signal line by the activation signal generation circuit 35, thereby generating an activation signal to activate the facsimile terminal 2. The activation signal in this instance is shown by 10-1 in FIG. 10. In the facsimile terminal 2, the activation signal from the portable telephone 1 is detected by the activation signal detection circuit 13 in step S901. When it is detected that a potential of a connecting line with the portable telephone 1 changes by the pattern of 10-1 in FIG. 10, the activation signal detection circuit 13 generates an activation signal to the control unit 45. When the activation signal is detected, in step S902, the control unit 45 turns on the switch 39 for a fixed time as shown by 10-2 in FIG. 10, thereby transmitting a first response signal to the portable telephone 1. In this instance, the control unit 36 of the portable telephone generates the activation signal to the facsimile terminal 2. After that, the change in potential of the connecting line with the facsimile terminal 2 is detected, thereby detecting the first response signal from the facsimile terminal 2. When the first response signal is detected in step S803, the switching circuits 40 and 41 are held to the earphone microphone terminal side.

The control unit 45 of the facsimile terminal 2 subsequently checks whether a CNG signal or a silent state for a fixed time has been detected by the CNG silence detection unit 42 within a fixed time after the detection of the activation signal or not in step S903. When the CNG signal or silent state is detected, in step S904, the switch 38 is turned on for a fixed time as shown by 10-3 in FIG. 10, thereby generating a second response signal to the portable telephone 1. In the portable telephone 1, the second response signal is detected in a manner similar to the foregoing first response signal in step S804. When the control unit 36 detects the second response signal, the switching circuits 40 and 41 are held to the earphone microphone terminal side. In step S905, the facsimile terminal 2 executes the facsimile reception. In step S906, when the facsimile reception is finished, the control unit 45 turns on or off the switch 38 by a pattern shown by 10-4 in FIG. 10, thereby outputting a third response signal to the portable telephone 1. When the control unit 36 of the portable telephone 1 detects the third response signal by detecting the change in potential of the connecting line in step S805, the wireless line is released.

Figure 10:
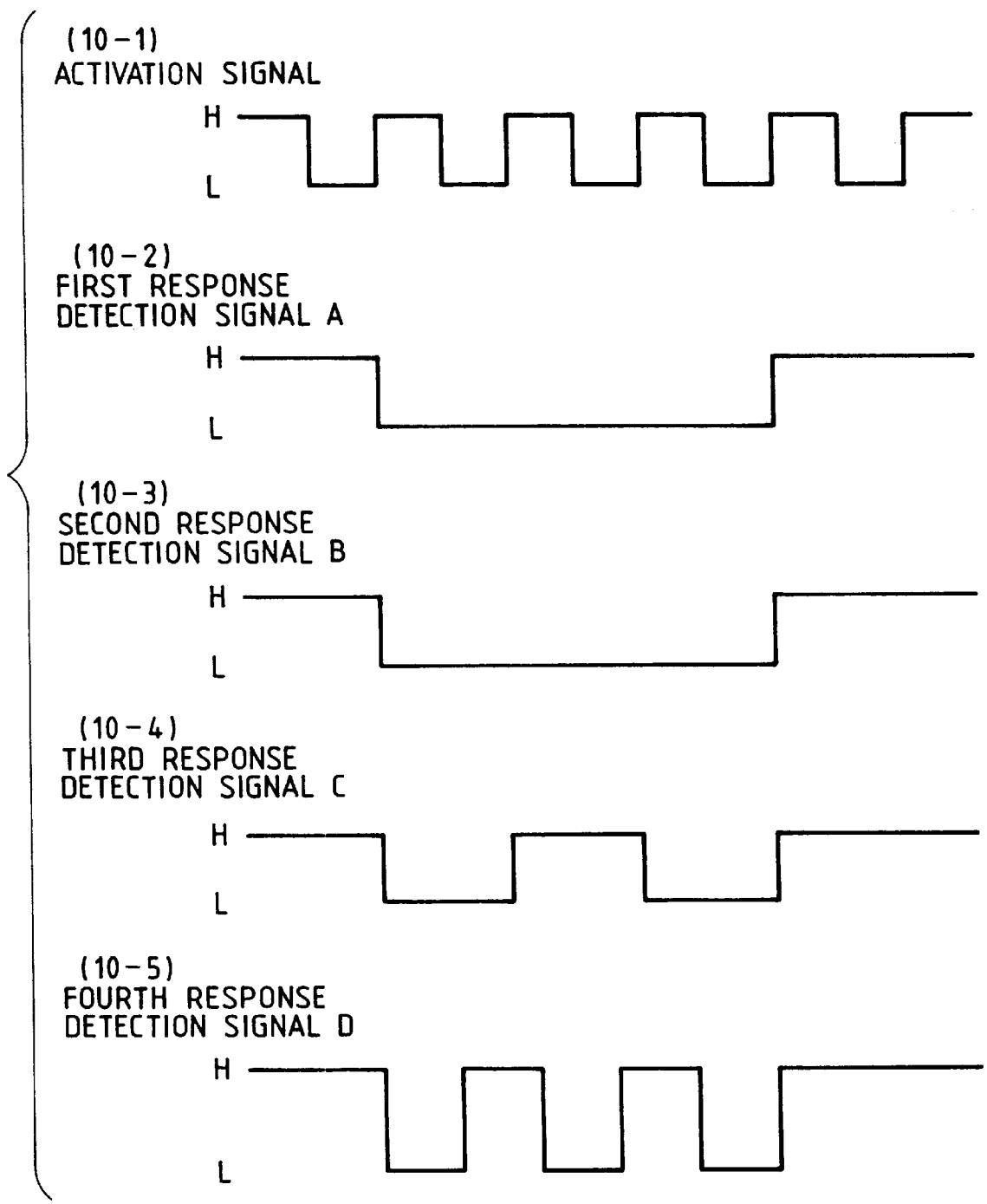
FIG. 10 is a diagram showing signals which are communicated between the portable telephone 1 and the facsimile terminal 2 in another embodiment.

When the facsimile terminal 2 doesn't detect the CNG signal or silent state in step S903, the control unit 45 turns on or off the switch 38 by a pattern shown by 10-5 in FIG. 10 in step S908, thereby outputting a fourth response signal to the portable telephone 1. In step S807, when the control unit 36 detects the fourth response signal by detecting the change in potential of the connecting line, the switching circuits 40 and 41 are switched to the speaker and microphone side in step S808. In step S809, the ringer unit 43 is activated, thereby calling the operator.

When the off-hook is performed by the operation of the operation unit 33 in step S810, a speech communication is executed in step S811. When the communication is finished and the on-hook operation is executed by the opeartion unit 33, the switching circuits 40 and 41 are switched to the earphone microphone terminal 3 side in step S813. The wireless line is released in step S806. The communication is finished.

In the case where a device such as an earphone microphone or the like other than the facsimile apparatus is connected to the earphone microphone terminal 3, since the first response signal is not detected in step S803, a display of a connection request of the facsimile such as "connect facsimile" or the like is performed in step S814.

Figure 11:
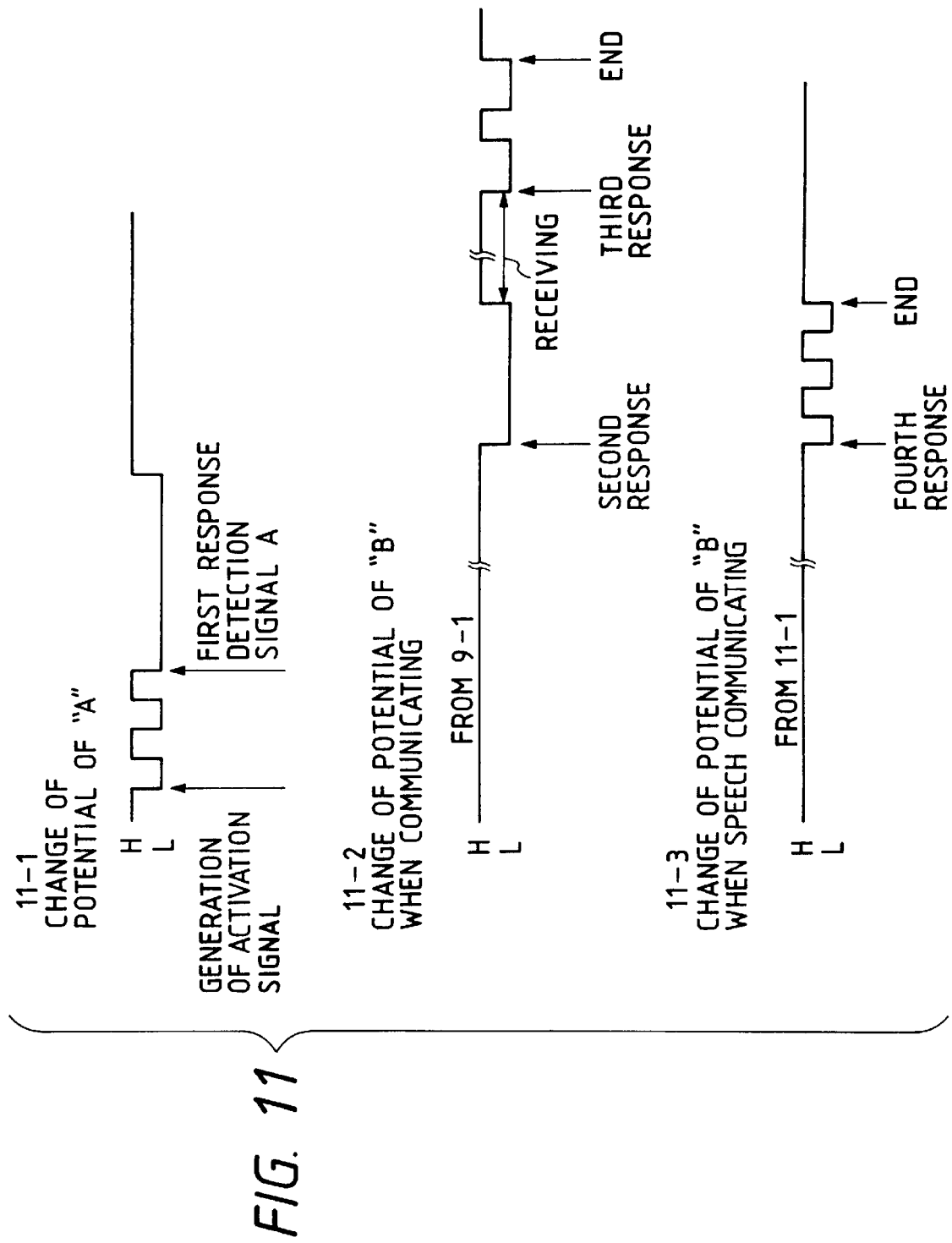
FIG. 11 is a diagram showing signals which are communicated between the portable telephone 1 and the facsimile terminal 2 in another embodiment.
Figure 12:
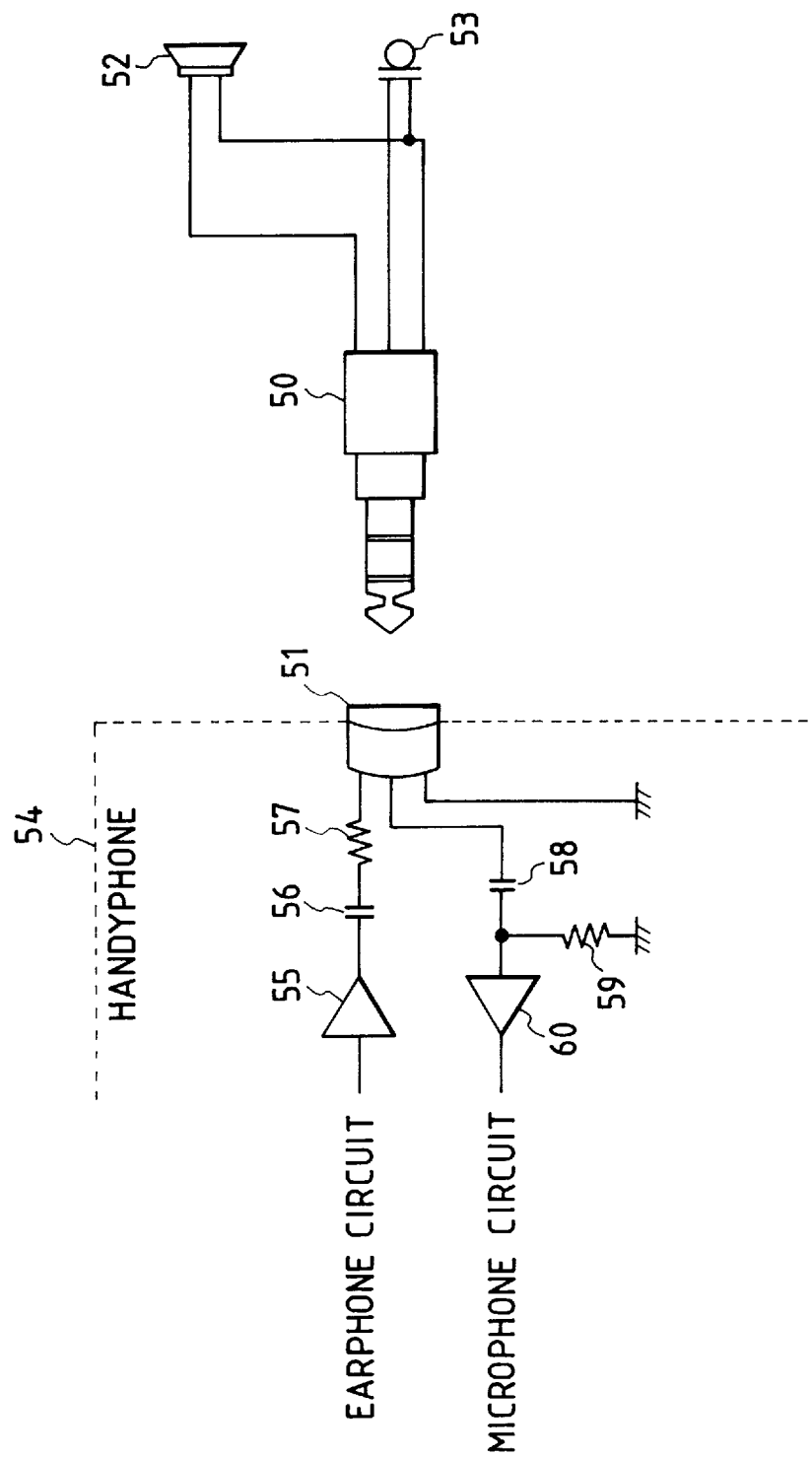
FIG. 12 is a schematic diagram for explaining a construction of an earphone microphone connecting unit of a conventional handyphone.
Figure 13:
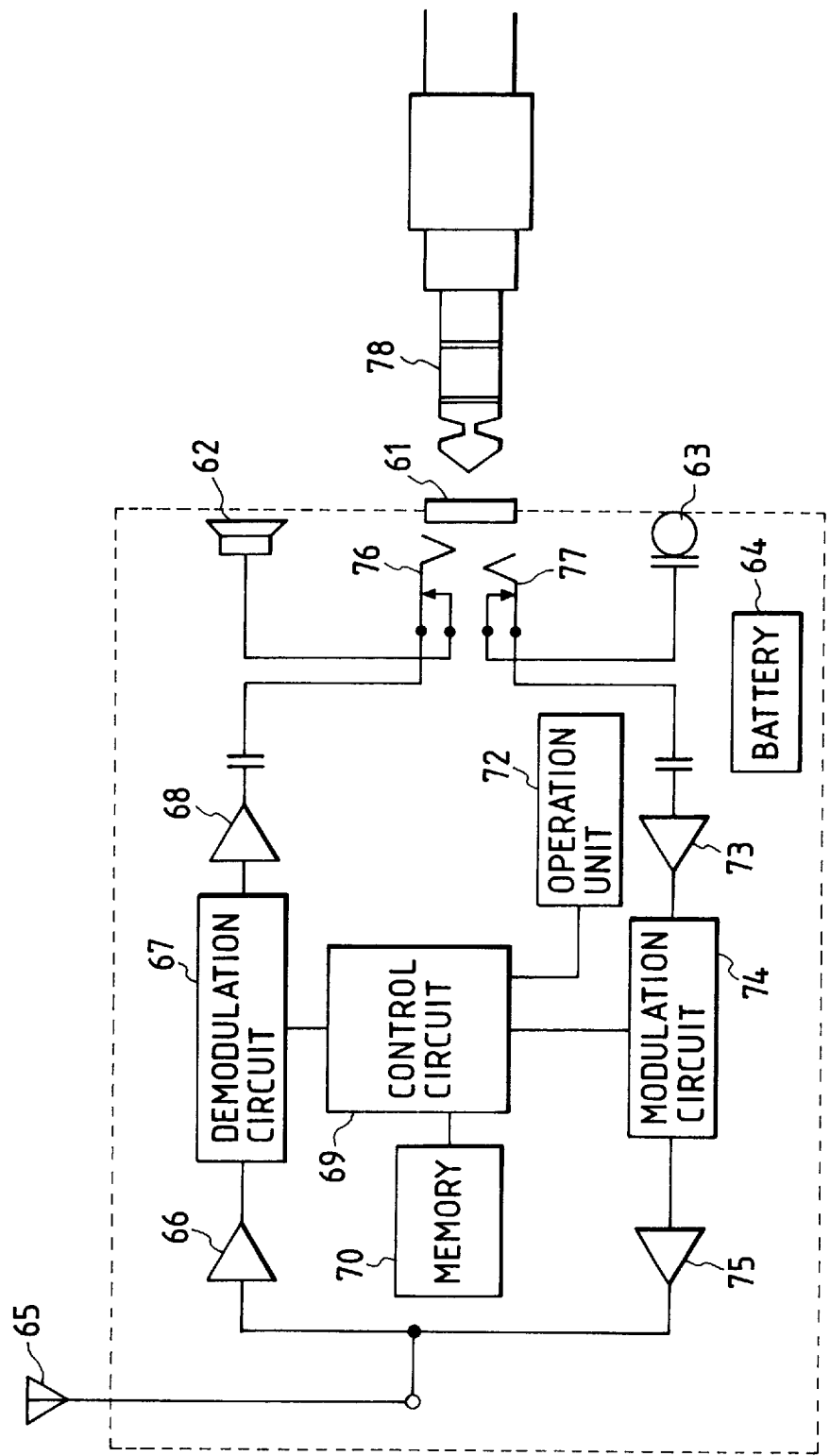
FIG. 13 is a circuit diagram showing an example of a circuit of a conventional mobile communicating apparatus.
Figure 14:
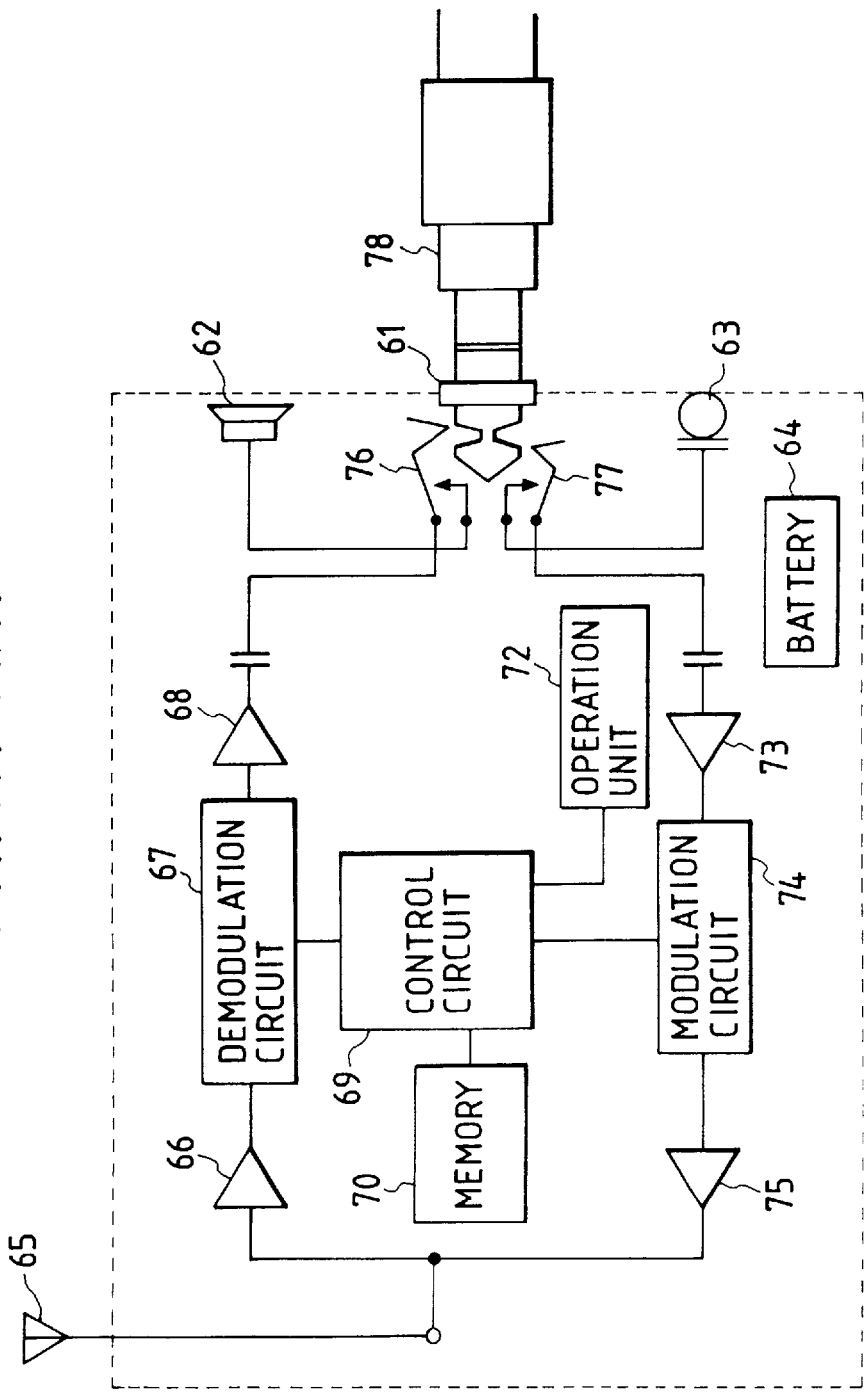
FIG. 14 is a diagram showing a state in which an earphone microphone plug of the conventional mobile communicating apparatus is inserted.

FIG. 11 is a diagram showing a change in potential of the connecting line between the portable telephone 1 and the facsimile terminal 2 upon incoming during the operation mentioned above. In the diagram, reference numeral 11-1 denotes a change in potential until the facsimile terminal 2 responds to the activation signal from the portable telephone 1 after the portable telephone 1 detected the incoming from the wireless line; 11-2 a change in potential in the case where the CNG or silent state is detected and the signal is facsimile received; and 11-3 a change in potential in the case where a speech communication is performed by the portable telephone 1.

Although the embodiment has been described above with respect to the example of the facsimile terminal as a data terminal device which is connected to the portable telephone (portable communicating apparatus), the invention can be also similarly applied with respect to a personal computer terminal. Although the embodiment has been described with respect to the example in which the activation signal which is generated from the activation signal generation circuit is turned on for the fixed time, a signal which is turned on at fixed intervals can be also used. Various signal patterns can be also formed by a combination.

According to the invention as described above, in the case where an external data terminal is connected to the portable communicating apparatus, the portable communicating apparatus can properly switch the speech communication and the data communication.

In the case where the data terminal is connected, a portable communicating apparatus which can properly activate the data terminal can be provided.

What is claimed is:

1. A portable communicating apparatus comprising:

connecting means for connecting an external audio device for performing at least input or output of speech through a connection line, or for connecting an external data communication terminal for performing data communication through the connection line;

receiving means for receiving a communication signal;

identifying means for identifying whether or not the received communication signal is a data communication signal;

judging means for judging whether said connecting means is connected to the external audio device or to the external data communication terminal; and communicating means for performing data communication using the external data communication terminal via the connection line or a speech communication using the external audio device in accordance with the results of an identification by said identifying means and a judgement by said judging means.

2. An apparatus according to claim 1, wherein said identifying means identifies a procedure signal for starting data communication.

3. An apparatus according to claim 1, wherein said identifying means identifies a silent state of a fixed time period.

4. An apparatus according to claim 1, wherein said connecting means disconnects a signal path to a built-in microphone and speaker when the connecting line is connected thereto, and transmits a signal on the signal path via the connecting line.

5. An apparatus according to claim 1, further comprising:

detecting means for detecting on the connecting line a response signal to the activation signal or a signal indicative of the end of the data communication; and means for releasing a communication line in accordance with a detection by said detecting means.

6. An apparatus according to claim 5, wherein said detecting means detects the response signal or the signal indicative of the end of the data communication by detecting a change in potential of the connecting line.

7. An apparatus according to claim 1, wherein in the case of data communication, said communicating means performs the data communication after outputting via the connecting line an activation signal to activate the external data communication terminal.

8. An apparatus according to claim 7, wherein said communicating means outputs the activation signal by means of changing voltage on the connecting line.

9. A portable communicating apparatus to which a data terminal can be connected, comprising:

switching means for switching between a communication path for a speech communication and a communication path for the data terminal; and connecting means for disconnecting a signal path to a built-in microphone and speaker when an external terminal is connected to said connecting means, and for transmitting a signal through the signal path to the external terminal to enable switching by said switching means, wherein the data terminal is connected by using said connecting means, and wherein the data communication and the speech communication are performed through said connecting means.

10. A portable communicating apparatus to which a data terminal can be connected, comprising:

switching means for switching a communication path for a speech communication and a communication path for the data terminal;

connecting means for disconnecting a signal path to a built-in microphone and speaker when an external terminal is connected, and for transmitting a signal through the signal path to the external terminal, wherein the data terminal is connected by using said connecting means and executes a communication through said connecting means; and selecting means for selecting either one of an automatic switching mode for automatically switching a speech communication and a data communication by the external data terminal in response to a received communication signal, a data communication mode for connecting the communication path to the external data terminal in response to the received communication signal, and a speech communication mode for connecting the communication path to the built-in microphone and speaker in response to the received communication signal.

11. An apparatus according to claim 10, wherein the switching means switches said communication path in accordance with the selection of said selecting means.

12. A data terminal which is connected to a portable communicating apparatus having connecting means for disconnecting a signal path to a built-in microphone and speaker when an external terminal is connected thereto and for transmitting a signal to the signal path to the external terminal, said data terminal comprising:

first detecting means for detecting an activation signal from the portable communicating apparatus;

second detecting means for detecting whether or not a received communication signal is a data communication signal; and transmitting means for transmitting a signal for allowing the portable communicating apparatus to switch to speech communication when said second detecting means does not detect the data communication signal.

13. A data terminal according to claim 12, further comprising means for transmitting a response signal to the portable communicating apparatus in response to a detection of the activation signal.

14. A data terminal according to claim 12, further comprising means for transmitting a signal indicative of the end of a data communication to the portable communicating apparatus in response to the end of the data communication.

15. A data terminal according to claim 12, wherein said transmitting means transmits a signal by changing a potential of a line connecting said data terminal with the portable communicating apparatus.

16. A communication method comprising the steps of:

connecting a data terminal to a connection port, the connection port being (1) for disconnecting a signal path to a built-in microphone and speaker when an external terminal is connected thereto, (2) for transmitting a signal to the signal path to the external terminal and (3) for transmitting a data communication to the portable communicating apparatus;

outputting an activation signal by the portable communicating apparatus to the connected data terminal to activate the data terminal in accordance with a communication signal received from a line, identifying by the data terminal whether or not the received communication signal is a data communication signal in accordance with a reception of the activation signal, and when the received communication signal indicates data communication, the data terminal executes a data communicating operation, and when the received communication signal does not indicate data communication, the data terminal outputs a switching signal for allowing the portable communication apparatus to switch to a speech communication, and switching by the portable communicating apparatus to speech communication in accordance with a reception of the switching signal.

17. A method according to claim 16, further comprising the steps of:

outputting by the data terminal to the portable communicating apparatus a response signal to the portable communicating apparatus in response to the reception of the activation signal or outputting an end signal indicative of the end of the data communication; and holding or finishing by the portable communicating apparatus the communication operation of the line in accordance with a reception of the response signal or the end signal.

18. A method according to claim 16, wherein transmission and reception of the signals between the portable communicating apparatus and the data terminal are executed by changing a potential of a line connecting the portable communicating apparatus to the data terminal.

19. A control method for a portable communicating apparatus comprising connecting means for connecting an external audio device for performing at least input or output of speech through a connection line, or for connecting an external data communication terminal for performing data communication through the connection line, said method comprising the steps of:

receiving a communication signal;

identifying whether or not the received communication signal is a data communication signal;

judging whether the connection means is connected to the external audio device or to the external data communication terminal; and performing data communication using the external data communication terminal via the connection line or a speech communication using the external audio device in accordance with and identification result in said identifying step and a judgement result in said judging step.

20. A method according to claim 19, wherein in said identifying step a procedure signal for starting data communication is identified.

21. A method according to claim 19, wherein in said identifying step a silent state of a fixed time period is identified.

22. A method according to claim 19, wherein in said detecting step the response signal or the signal indicative of the end of the data communication is detected by detecting a change in potential of the connecting line.

23. A method according to claim 19, further comprising the steps of:

disconnecting a signal path to a built-in microphone and speaker when the connecting line is connected thereto; and transmitting a signal on the signal path via the connecting line.

24. A method according to claim 23, wherein in said connecting step the connecting means judges that the connecting line has been connected.

25. A method according to claim 19, wherein, in the case of the data communication, the data communication is performed after outputting via the connecting line an activation signal to activate the external data communication terminal.

26. A method according to claim 25, further comprising the steps of:

detecting on the connecting line a response signal to the activation signal or a signal indicative of the end of the data communication; and holding or releasing a communication line in accordance with a detection in said detecting step.

27. A method according to claim 25, wherein the activation signal is output in said communicating step by means of changing voltage on the connecting line.

28. A control method for a portable communication apparatus comprising connecting means connected to an external data terminal, said method comprising the steps of:

switching between a communication path for a speech communication and a communication path for the data terminal; and disconnecting a signal path to a built-in microphone and speaker when an external terminal is connected to the connecting means, and transmitting a signal through the signal path to the external terminal to enable switching in said switching step, wherein the data communication and the speech communication are performed through the connecting means.

29. A method for a portable communication apparatus comprising connecting means connected to an external data terminal and switch means for performing switching between a communication path for a call and a communication by the data terminal, said method comprising the steps of:

detecting that the external data terminal has been connected to the portable communication apparatus; and disconnecting a signal path to a built-in microphone and speaker when a detection in said detecting step detects that the external data terminal has been connected; and transmitting a signal on the signal path to the external data terminal;

automatically switching between the call and the data communication by the external data terminal in response to a received communication signal; and selecting either one of a data communication mode for connecting the communication path to the external data terminal in response to the received communication signal, and a call communication mode for connecting the communication path to the built-in microphone and speaker in response to the received communication signal.

30. A method according to claim 29, wherein said switching step performs the switching of the communication path in accordance with a selection of said selecting step.

31. A control method for a data terminal which is connectable to a portable communicating apparatus, the portable communicating apparatus having connecting means for disconnecting a signal path to a built-in microphone and speaker when an external terminal is connected thereto and for transmitting a signal to the signal path to the external terminal, said method comprising the steps of:

detecting an activation signal from the portable communicating apparatus;

identifying whether or not a received communication signal is a data communication signal; and a first sending step for sending a signal for switching a call to the portable communicating apparatus when the received communication signal is not identified to be a data communication signal in said identifying step.

32. A method according to claim 31, further comprising a second step for sending out a response signal to the portable communication apparatus, in response to a detection of the activation signal in said detecting step.

33. A method according to claim 31, further comprising a third sending step for sending out a signal indicative of an end of data communication to the portable communication apparatus, in response to the end of the data communication.

34. A method according to claim 31, wherein said first sending step sends out the signal by changing a potential of a line connecting the portable communication terminal to the external data terminal.

* * * * *

UNITED STATES PATENT AND TRADEMARK OFFICE
CERTIFICATE OF CORRECTION

PATENT NO. : 5,870,679

DATED : February 9, 1999

INVENTOR(S) : YOSUKE EZUMI

It is certified that error appears in the above-identified patent and that said Letters Patent is hereby corrected as shown below:

On the title page, item

[56] REFERENCES CITED

U.S. Patent Documents
"Kumahara" should read --Kuwahara--.

Attorney, Agent or Firm
"Fitzpatrick Cella Harper &" should read
    --Fitzpatrick, Cella, Harper &--.

COLUMN 2

Line 46, "an" should read --a--.

COLUMN 3

Line 25, "an" should read --a--.

COLUMN 4

Line 46, "an" should be deleted.

UNITED STATES PATENT AND TRADEMARK OFFICE
CERTIFICATE OF CORRECTION

PATENT NO.    :  5,870,679

DATED         :  February 9, 1999

INVENTOR(S)   :  YOSUKE EZUMI

It is certified that error appears in the above-identified patent and that said Letters Patent is hereby corrected as shown below:

COLUMN 10

Line 60, "wherein" should read --wherein,--.

Signed and Sealed this

Eighteenth Day of January, 2000

Attest:

Q. TODD DICKINSON

*Attesting Officer*    Commissioner of Patents and Trademarks

UNITED STATES PATENT AND TRADEMARK OFFICE
CERTIFICATE OF CORRECTION

PATENT NO. : 5,870,679

DATED : February 9, 1999

INVENTOR(S) : YOSUKE EZUMI

It is certified that error appears in the above-identified patent and that said Letters Patent is hereby corrected as shown below:

COLUMN 13

Line 4, "claim 19," should read --claim 26--.

Signed and Sealed this

Twenty-ninth Day of May, 2001

Attest:

NICHOLAS P. GODICI

Attesting Officer     Acting Director of the United States Patent and Trademark Office